3,081,331
POLY PHOSPHORUS ESTER CONDENSATES
AND THEIR PREPARATION
Lester Friedman, Beachwood, Ohio, assignor to Weston Chemical Corporation, Newark, N.J., a corporation of New Jersey
No Drawing. Filed Aug. 7, 1961, Ser. No. 129,529
16 Claims. (Cl. 260—461)

This invention relates to tertiary phosphite esters and the corresponding phosphates and thiophosphates.

It is an object of the present invention to prepare novel phosphites.

Another object is to prepare novel phosphates and thiophosphates.

Still further objects and the entire scope of applicability of the present invention will become aparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing polymeric compounds having the Formula I

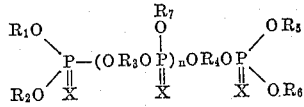

wherein $R_1$, $R_2$, $R_5$, $R_6$, and $R_7$ are the residue of polypropylene glycol from which one of the hydroxyl hydrogens has been removed. $R_3$ and $R_4$ are selected from the group consisting of the residues of polyethylene glycol and polypropylene glycol from which the two hydroxyl hydrogens have been removed, $n$ is selected from the group consisting of zero and an integer and $x$ is selected from the group consisting of nothing, oxygen and sulfur. Preferably $R_3$ and $R_4$ are the residues of polypropylene glycol.

The compounds within Formula I are normally prepared as mixtures. Generally over 50% and usually the vast majority of the free hydroxyl groups present, e.g. about 90%, are secondary hydroxyl groups since $R_1$, $R_2$, $R_5$, $R_6$, and $R_7$ will normally have the structure $$HO-CH-CH_2-O-(CH_2CH-O)_x-H$$
$$\qquad |\qquad\qquad\qquad\quad |$$
$$\ \ \ CH_3\qquad\qquad\quad CH_3$$

where $x$ is an integer.

The phosphites within Formula I can be prepared by reacting a tris hydrocarbon phosphite or a tris chloroaryl phosphite with a polypropylene glycol alone or admixed with a polyethylene glycol in the proper proportions in the presence of a catalyst.

There should be employed more than two moles and less than three moles of the glycol per mole of the phosphite. Usually there are employed between 2.1 and 2.5 moles of glycol per mol of phosphite. With 2.5 moles of glycol per mole of phosphite there is prepared the simplest compound within Formula I. Thus wtih 5 moles of dipropylene glycol and 2 moles of triphenyl phosphite (ratio 2.5:1) there is formed the compound having the formula

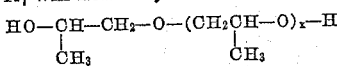

where DPG is

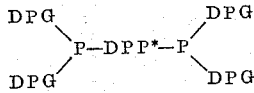

and DPG* is

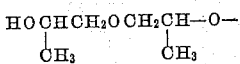

If the mole ratio is reduced to 2.1:1 there is prepared the compound having 21 glycol groups and 10 phosphorus atoms. When the glycol is dipropylene glycol the product essentially has the formula

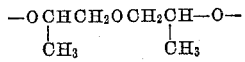

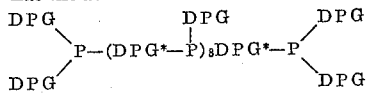

If more than 2.5 moles of glycol are employed per mole of phosphite some tris polypropylene glycol phosphite will be admixed with the desired product and if at least 3 moles of glycol are employed only the tris polypropylene glycol phosphite will be produced. A portion of the polypropylene glycol, up to 55% of the total moles of glycol, can be replaced by polyethylene glycol. Since polyethylene glycol reacts with the triphenyl phosphite or the like faster than the corresponding polypropylene glycol the polyethylene glycol will form primarily links within the chain rather than end groups. The polyethylene glycol is preferably not employed in an amount in excess of that required to form links in the polymer chain.

The reaction is carried out by heating in a vacuum and distilling out the phenol formed. The reaction is conveniently carried out at 5 mm. at a pot temperature of 140–150° C. and a vapor temperature of 115–118° C., although this is not critical.

As the polypropylene glycol there can be used dipropylene glycol, tripropylene glycol, polypropylene glycol 425 (polypropylene glycol having an average molecular weight of 425), polypropylene glycol 1025 (polypropylene glycol having an average molecular weight of 1025), polypropylene glycol 2025 (polypropylene glycol having an average molecular weight of 2025) and polypropylene glycol having an average molecular weight of 3000 or mixtures thereof.

As the polyethylene glycol there can be used diethylene glycol, triethylene glycol, tetraethylene glycol, polyethylene glycol with an average molecular weight of about 1000, polyethylene glycol with an average molecular weight of about 3000.

As the trihydrocarbon or trihaloaryl phosphite there can be used trialkyl and triaryl phosphites such as triphenyl phosphite, tri-o-cresyl phosphite, tri-p-cresyl phosphite, tri-m-cresyl phosphite, tri-xylenyl phosphite, tridecyl phosphite, diphenyl decyl phosphite and triethyl phosphite as well as trihaloaryl phosphites such as tri-p-chlorophenyl phosphite, tri-o-chlorophenyl phosphite, etc.

The reaction can be catalyzed by alkaline catalysts preferably having a pH of at least 11 in a 0.1 N solution. The catalyst can be from 0.1–1.0% of sodium phenolate, sodium cresylate, potassium phenolate, sodium methylate, sodium decylate, sodium dipropylene glycolate or the like.

More preferably the reaction is catalyzed by a dihydrocarbon (such as aryl or alkyl) or dihaloaryl phosphite, e.g. 0.1–1% of diphenyl phosphite, di-o-cresyl phosphite, di-p-cresyl phosphite, diethyl phosphite, didecyl phosphite, dioctadecyl phosphite, di-p-chlorophenyl phosphite, etc.

In forming the polymeric phosphites of dipropylene glycol and tripropylene glycol it is not necessary to react the glycol with triphenyl phosphite or the like. Instead the phosphites of the present invention can be formed by distilling out the appropriate amount of dipropylene glycol or tripropylene glycol upon heating tris dipropylene glycol phosphite or tris tripropylene glycol phosphite or mixed tripropylene glycol bis dipropylene glycol in a vacuum. Preferably such reaction is carried out in the presence of a catalyst as above listed, e.g. 0.5% of diphenyl phosphite. Thus to prepare dipropylene glycol tetrol diphosphite

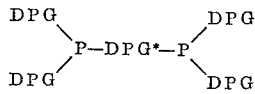

1 mole of tris dipropylene glycol phosphite is heated in a vacuum with 0.5% diphenyl phosphite catalyst until 0.5 mole of dipropylene glycol is removed by distillation.

To prepare dipropylene glycol pentol triphosphite 1 mole of tris dipropylene glycol phosphite is heated as above until ⅔ mole of dipropylene glycol is removed by distillation.

The tris dipropylene glycol phosphite can be prepared as disclosed in my copending application 109,842, filed May 15, 1961.

The phosphates within generic Formula I can be prepared by oxidizing the corresponding phosphites, e.g. with hydrogen peroxide, aqueous hydrogen peroxide, or other peroxy compounds, e.g. peracetic acid. The peroxy compound is used in a stoichiometric amount. In forming the polymeric phosphates of dipropylene glycol and tripropylene glycol it is possible to use the same technique as with the corresponding phosphites, e.g. tris dipropylene glycol phosphate can be heated in vacuum in the presence of a catalyst as above set forth until the appropriate amount of dipropylene glycol has distilled over.

The thiophosphates within generic Formula I can be prepared by adding the stoichiometric quantity of sulfur to the corresponding phosphite and heating to 110-130° C. In the case of the polymeric thiophosphates of dipropylene glycol and tripropylene glycol there can also be employed the distillation technique wherein, for example tris dipropylene glycol thiophosphate is heated under vacuum in the presence of diphenyl phosphite or other catalyst until the desired amount of dipropylene glycol has been removed by distillation.

The polymeric products of the present invention are water white viscous liquids.

Examples of polymeric phosphites, phosphates and thiophosphates within Formula I and included in the present invention are dipropylene glycol tetrol diphosphite, dipropylene glycol pentol triphosphite, dipropylene glycol hexol tetraphosphite, dipropylene glycol heneicosal decaphosphite having the formula

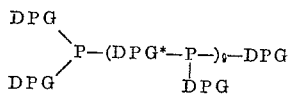

tripropylene glycol tetrol diphosphite, tripropylene glycol hexol tetraphosphite, polypropylene glycol 425 tetrol diphosphite, polypropylene glycol 425 pentol triphosphite, polypropylene glycol 425 hexol tetraphosphite, polypropylene glycol 425 octol hexaphosphite, polypropylene glycol 1025 tetro diphosphite, polypropylene glycol 1025 pentol triphosphite, polypropylene glycol 1025 hexol tetraphosphite, polypropylene glycol 1025 heptol pentaphosphite, polypropylene glycol 2025 tetrol diphosphite, polypropylene glycol 2025 pentol triphosphite, polypropylene glycol 2025 hexol tetraphosphite, dipropylene glycol tetrol diethylene glycol diphosphite (where the 4 hydroxy containing end groups are dipropylene glycol residues and the connecting link between the two phosphorus atoms is the diethylene glycol grouping).

The phosphates and thiophosphates of any of these phosphites also are included. Typical examples include dipropylene glycol tetrol diphosphate, dipropylene glycol tetrol dithiophosphate, dipropylene glycol tetrol phosphite phosphate, dipropylene glycol tetrol phosphite thiophosphate, dipropylene glycol tetrol phosphate thiophosphate, dipropylene glycol pentol triphosphate, dipropylene glycol pentol trithiophosphate, dipropylene glycol hexol tetraphosphate, dipropylene glycol hexol tetrathiophosphate, dipropylene glycol octol hexaphosphate, dipropylene glycol octol thiophosphate, tripropylene glycol tetrol diphosphate, tripropylene glycol tetrol dithiophosphate, tripropylene glycol pentol triphosphate, tripropylene glycol hexol tetrathiophosphate, polypropylene glycol 425 tetrol diphosphate, polypropylene glycol 425 tetrol dithiophosphate, polypropylene glycol 425 hexol tetraphosphate, polypropylene glycol 425 hexol tetrathiophosphate, polypropylene glycol 1025 tetrol diphosphate, polypropylene glycol 1025 tetrol dithiophosphate, polypropylene glycol 1025 hexol tetrathiophosphate, polypropylene glycol 1025 hexol tetraphosphate, polypropylene glycol 2025 tetrol disphosphate, polypropylene glycol 2025 tetrol dithiophosphate, polypropylene glycol 2025 pentol triphosphate, polypropylene glycol 2025 hexol tetraphosphate, and polypropylene glycol 2025 hexol tetrathiophosphate.

Another and unrelated group of compounds contemplated by the present invention are the tertiary phosphite, phosphate and thiophosphate esters of an alkaneetherpolyol having 3 to 6 hydroxyl groups and being the ether of an alkane polyol having 3 to 6 hydroxyl groups with an alkylene glycol or polyalkylene glycol. These esters can be prepared by reacting the appropriate ether with a trihydrocarbon phosphite or trihaloaryl phosphite in the presence of a dihydrocarbon or dihaloaryl phosphite or an alkaline catalyst. Any of the catalysts previously mentioned can be employed in the proportions previously set forth. The preferred catalyst is diphenyl phosphite. To insure an excess of hydroxyl groups there should be over one mole of an ether having three hydroxyl groups per mole of triphenyl phosphite or the like. Generally at least 1.5 moles of the ether is employed and preferably at least 3 moles of the ether are employed. With ether polyols having 6 hydroxy groups as little as 1 mole of the ether can be employed per mole of triphenyl phosphite. Preferably there are prepared compounds having at least six feet hydroxyl groups. The preferred ethers are ethers of an alkane polyol having 3 to 6 carbon atoms and 3 to 6 hydroxyl groups with polypropylene glycol. (These compounds can be made in known fashion by reacting the alkane polyol with excess propylene oxide.) However derivatives of polyethylene glycol, ethylene glycol and propylene glycol can also be used. As the alkanepolyol for forming the initial ether there can be used glycerine, 1,2,6 - hexanetriol, trimethylolpropane, trimethylolethane, sorbitol, mannitol, arabitol or the like.

Typical ethers for reacting with triphenyl phosphite and the like include the triols from 1,2,6-hexanetriol and propylene oxide having molecular weights of 750, 1500, 2400, 4000 (available commercially as LHT 240, LHT 112, LHT 67 and LHT 42 respectively), triols from glycerine and propylene oxides having molecular weights of 1000 and 3000 (available commercially as LG 168 and LG 56 respectively).

Typical phosphites prepared from such alkaneetherpolyols and having free hydroxyl groups include the tris-(propylene oxide-1,2,6-hexanetriol adduct) phosphite wherein the adduct has a molecular weight of 750 (tris LHT 750 phosphite). The tris esters of phosphorous acid and the corresponding adducts having molecular weights of 1500, 2400 and 4000 (tris LHT 112 phosphite, tris LHT 67 phosphite, tris LHT 42 phosphite). The above esters each have 6 free hydroxyl groups (since 3 moles of the adduct were reacted with 1 mole of triphenyl phosphite in each case). The tris (propylene oxide-glycerine adduct) phosphite where the adduct has a molecular weight of 1000 (tris LG–168 phosphite), the corresponding phosphite of the adduct having a molecular weight of 3000 (tris LG–56 phosphite). These esters also have six free hydroxyl groups. The tris-(sorbitol-propylene oxide adduct) phosphite (having a molecular weight of 1000 and having 15 free hydroxyl groups), the tris propylene oxide adduct of trimethylolpropane (having a molecular weight of 1700) phosphite having 6 free hydroxyl groups, the tris ethylene oxide adduct of glycerine having a molecular weight of 1000 can also be used.

The corresponding phosphates and thiophosphates can be made by oxidizing or sulfurizing the corresponding phosphites in the manner previously set forth. Examples of such phosphates and thiophosphates are tris LHT 42 phosphate, tris LHT 42 thiophosphate, tris LHT 67 phosphate, tris LHT 67 thiophosphate, tris LHT 112 phosphate, tris LHT 240 phosphate, tris LHT 112 thiophosphate, tris LHT 240 thiophosphate, tris LG–56 phosphate, tris LG–56 thiophosphate, tris LG–168 phosphate and tris LG–168 thiophosphate.

These products in general are viscous liquids.

The new compounds of the present invention, both those included in Formula I as well as those made from alkaneetherpolyols, have many uses.

Thus they can be used as plasticizers for polyurethanes. Because of their hydroxyl groups they are excellent for incorporation into urethane systems where they react with the isocyanate groups in the growing polymer chain and thus become fixed. They can be the sole hydroxyl reactant present or they can be used in admixture with other polyhydroxy compounds in forming the polyurethanes. Foamed polyurethanes can be obtained by adding water prior to the addition of the isocyanate. The solid polyurethanes obtained have good flame proofing properties and are useful as linings for textiles, insulation in building construction work, upholstery filling material, as threads in making girdles and brassieres, etc.

As examples of polyisocyanates which can be employed to make the polyurethane there can be used toluene-2,4-diisocyanate; toluene-2,6-diisocyanate; 4-methoxy-1,3-phenylene - diisocyanate; 4 - chloro - 1,3 - phenylenediisocyanate; 4 - isopropyl - 1,3 - phenylenediisocyanate; 4 - ethoxy - 1,3 - phenylene - diisocyanate; 2,4 - diisocyanatodiphenylether; 3,3 - dimethyl - 4,4 - diisocyanatodiphenylmethane; mesitylene diisocyanate; durylene diisocyanate; 4,4' - methylenebis (phenylisocyanate), benzidine diisocyanate, o-nitrobenzidine diisocyanate; 4,4'-diisocyanatodibenzyl; 1,5-naphthalene diisocyanate; tetramethylene diisocyanate and hexamethylene diisocyanate. Triisocyanates such as toluene 2,4,6-triisocyanate and 2,4,4'-triisocyanatodiphenylether can be used to provide additional crosslinking.

Any of the conventional basic catalysts employed in polyurethane foam technology can be used. These include N-methyl morpholine, N-ethyl morpholine, triethyl amine and other trialkyl amines, 3-diethylaminopropionamide, heat activated catalysts such as triethylamine citrate, 3 - morpholinopropionamide, 2 - diethylaminoacetamide, etc. In utilizing one shot systems there can be included especially active catalysts such as triethylenediamine, dibutyltin dilaurate, dibutyltin diacetate, di-2-ethylhexyltin oxide, dibutyltin monolaurate, octylstannoic acid, dibutyltin diethoxide.

Conventional surfactants can be added such as polydimethyl siloxane (50 centistokes grade); triethoxy dimethyl polysiloxane molecular weight 850 copolymerized with a dimethoxypolyethylene glycol having a molecular weight of 750 and any of the other siloxanes disclosed in Hostettler French Patent 1,212,252.

The novel hydroxy containing phosphites, phosphates and thiophosphates can be used as the sole hydroxyl group containing compounds in forming the polyurethanes or they can be replaced in part by other poly hydroxy containing compounds such as polyethylene glycol having molecular weights of 400 to 3000, polypropylene glycol having molecular weights of 400 to 3000, ethylene glycol, diethylene glycol, triethylene glycol, propylene glycol, dipropylene glycol, tripropylene glycol, 1,4-butanediol, thiodiglycol, glycerol, trimethylolethane, trimethylolpropane, glycerine-propylene oxide adduct, 1,2,6-hexanetriolpropylene oxide adducts having molecular weights of 500, 700, 1500, 2500, 3000 or 4000, trimethylol phenol, triethanolamine, pentaerythritol, methyl glucoside, castor oil, glycerine ethylene oxide adducts, diethanolamine, etc. Hydroxyl containing polyesters can be used, e.g. mixed ethylene glycol-propylene glycol-adipate resin, polyethylene adipate-phthalate polyneopentylene sebacate, etc.

The phosphites, phosphates and thiophosphates of this invention also are useful for incorporation into epoxy resin systems. Thus they can react directly in an epoxy system, e.g. with dicyclopentadiene diepoxide, catalyzed preferably by an alkyl aminate. They also can be reacted with maleic anhydride or other polybasic acid or anhydride to give the corresponding acid ester phosphite (or phosphate or thiophosphate) ester which can react in many epoxy systems without additional catalyst.

They also can be employed to form polyesters, e.g. by reaction mole for mole with maleic anhydride, phthalic anhydride, dimethyl terephthalate, fumaric acid, succinic acid, oxalic acid, itaconic acid, etc. and are additionally useful as textile softening agents and as surfactants.

Additionally they are useful as lubricants, heat transfer fluids, hydraulic fluids and pump fluids. They can be used in place of tricresyl phosphate as gasoline additives, e.g. in an amount of 0.1%. They are also suitable as plasticizers in polyester systems and free radical formed systems, e.g. polymerized methyl methacrylate. The phosphites and thiophosphates are suitable as stabilizers for vinyl chloride resins and other halogen containing resins, e.g. when used in an amount of 0.25–10% by weight of the resin. They can be used in existing glycol type lubricants and fluids.

As previously pointed out the products of the present invention are viscous liquids (although the polyurethanes formed therefrom are solids).

Unless otherwise indicated all parts and percentages in the present specification and claims are by weight.

EXAMPLE 1

Method A

Tris dipropylene glycol phosphite (made according to Example 1 of Friedman application 109,842, filed May 15, 1961) 430 grams (1 mole) and still containing about 1 gram of diphenyl phosphite catalyst was heated in a vacuum (5 min.) at 140° C. Dipropylene glycol began to distill, B.P. 115° C./5 mm. Distillation was continued until 67 grams were collected, the theoretical amount for formation dipropylene glycol tetrol diphosphite. The product was filtered hot through Celite (diatomaceous earth). The dipropylene glycol tetrol diphosphite product was a somewhat viscous clear colorless liquid $n_D^{25}$ 1.4654.

Method B

Dipropylene glycol 335 grams (2.5 mols), triphenyl phosphite 310 grams (1 mole), and 4 grams of diphenyl phosphite (catalyst) were heated at 125° C. for two hours, then a 10 mm. vacuum was applied and phenol removed by distillation. After 6 hours a total of 700 grams (71%) of phenol M.P. 40° C. were obtained. Subsequent distillation was contaminated with increasing amounts of dipropylene glycol. The mixed distillate (30 grams) and 50 grams excess dipropylene glycol were added to the flask and with fractionation a mixture of phenol and dipropylene glycol was removed overhead. Distillation was continued until a total of 132 grams was obtained (the theory for phenol and the excess dipropylene glycol). The last 10 ml. of distillate were free of contaminating phenol; it was essentially pure dipropylene glycol. The dipropylene glycol tetrol diphosphite product was a clear, colorless liquid, $n_D^{25}$ 1.4652.

EXAMPLE 2

Method A

Tris dipropylene glycol phosphite (made according to Friedman application 109,842, Example 1) 215 grams (0.5 mole) was heated to 140° C. in vacuo (5 mm.) until distillation occurred. Dipropylene glycol was distilled over, B.P. 115° C./5 min. Distillation was continued until a total of 46 grams of dipropylene glycol was collected (about ½ hour). The pot residue was filtered through Celite and dipropylene glycol pentol triphosphite recovered as a clear, colorless somewhat viscous liquid, $n_D^{25}$ 1.4660.

*Method B*

Dipropylene glycol 536 grams (4 moles, which is 0.5 mol in excess of theory) triphenyl phosphite 465 grams (1.5 moles) and 2 grams of diphenyl phosphite (catalyst) were heated to 140° C. for 1 hour, then cooled to 125–130° C. and distillation effected at 10 mm. pressure using an 18 inch packed fractionating column. Approximately 375 grams of good phenol (M.P. 40° C.) was collected during 5 hours. Subsequent distillation was increasingly contaminated with dipropylene glycol. A total of 115 grams of combined additional distillate was collected (48 grams of phenols and 67 grams of dipropylene glycol—0.5 mole). The pot residue after filtration over Celite had an $n_D^{25}$ 1.4661. Infrared analysis was identical with the material prepared by Method A. Both products were free of aromatic bands due to the starting phenol.

EXAMPLE 3

*Method A*

Tris dipropylene glycol phosphite 215 grams (0.5 mole) containing about 0.5 grams of diphenyl phosphite was heated to 140° C. at 5 mm. Dipropylene glycol was distilled over at 115° C./5 min. Distillation was continued until a total of 50 grams of dipropylene glycol was collected (about 30 minutes). The pot residue was filtered over Celite and the dipropylene glycol hexol tetraphosphite was recovered as a clear, colorless, somewhat viscous liquid, $n_D^{25}$ 1.4662.

*Method B*

Dipropylene glycol 469 grams (3.5 moles which is an excess of 67 grams over the theoretical amount required), triphenyl phosphite 310 grams (1 mole) and 2 grams of diphenyl phosphite was heated at 140° C. for 1 hour, then cooled to 125–130° C. and distillation effected at 10 mm. pressure through the column described in Example 2B. Phenol was distilled at 70–80° C./10 min. (M.P. 40° C.) until 220 grams were collected. A mixed distillate consisting of phenol and some of the excess dipropylene glycol then came over. Fractionation was continued during the distillation. A total of 129 grams of phenol-dipropylene glycol mixture was collected. The pot residue was filtered hot through Celite to give a product having an $n_D^{25}$ 1.4661. The infrared analysis was identical with that of the product in method A and was free of aromatic absorption bands due to free phenol.

EXAMPLE 4

Polypropylene glycol 425 in an amount of 1386 grams (3.26 moles); 405 grams (1.31 moles) of triphenyl phosphite and 5 grams of diphenyl phosphite (catalyst) were heated in vacuo at 120–130° C. Phenyl began to distill over and as distillation proceeded the distillation was allowed to increase to a limit of 170° C. The phenol was pure, M.P. 40° C. To insure complete removal of phenol the reaction mixture was sparged with nitrogen for ½ hour at 170° C. and 10 mm. About 6 grams of distillate was collected in this manner. The recovery of phenol was quantitative for 3.94 moles. The pot residue was filtered through a Celite bed. The yield of polypropylene glycol 425 tetrol diphosphite as a clear, colorless somewhat viscous liquid was 1418 grams $n_D^{25}$ 1.4565. The total reaction time was 6 hours. Infrared analysis of the product was free of aromatic bonds due to free phenol.

EXAMPLE 5

Polypropylene glycol 425 in an amount of 1488 grams (3.5 moles); 465 grams (1.5 moles) and 3 grams of diphenyl phosphite (catalyst) were heated in vacuo at 120–130° C. Phenol began to distill over and as distillation continued the pot temperature was allowed to increase to a limit of 170° C. The phenol that distilled was pure. To insure complete removal of phenol the reaction mixture was sparged with nitrogen for ½ hour at 170° C./10 mm. The total amount of phenol collected was 422 grams (theoretical). The pot residue was filtered through a bed of Celite to yield polypropylene glycol 425 pentol triphosphite as a clear, colorless viscous liquid in an amount of 1530 grams, $n_D^{25}$ 1.4566. The reaction time was 6 hours. Infra red analysis showed freedom from aromatic absorption bands due to free phenol.

EXAMPLE 6

Tripropylene glycol 633 grams (3.1 moles), triphenyl phosphite 310 grams (1 mole) and 5 grams of diphenyl phosphite (catalyst) were heated in vacuo. The phenol was distilled overhead at a pot temperature of 140–150° C. The phenol had a B.P. of 80–85° C./15 mm. At the end of the reaction some tripropylene glycol distilled out. The total distillate was 232 grams (phenol plus tripropylene glycol). The pot residue was tris tripropylene glycol phosphite containing about 17 grams of tripropylene glycol. After filtration through Celite it was a clear, colorless liquid.

Twenty-five grams of tris tripropylene glycol phosphite were heated in vacuo at 150° C. Tripropylene glycol began to distill out B.P. 135° C./10 mm. When 5 grams of distillate had collected (pure tripropylene glycol) the product obtained was tripropylene glycol tetrol diphosphite.

EXAMPLE 7

Example 4 was repeated replacing the polypropylene glycol 425 by 3.26 moles of polypropylene glycol 1025 and the product recovered was polypropylene glycol 1025 tetrol diphosphite as a viscous liquid.

EXAMPLE 8

Example 4 was repeated replacing the polypropylene glycol 425 by 3.26 moles of polypropylene glycol 2025 and the product recovered was polypropylene glycol 2025 tetrol diphosphite as a viscous liquid.

EXAMPLE 9

Example 5 was repeated replacing the polypropylene glycol 425 by 3.5 moles of polypropylene glycol 1025 and the product recovered was polypropylene glycol 1025 pentol triphosphite as a viscous liquid.

EXAMPLE 10

Example 5 was repeated replacing the polypropylene glycol 425 by 3.5 moles of polypropylene glycol 425 by 3.5 moles of polypropylene glycol 2025 and the product recovered was polypropylene glycol 2025 pentol triphosphite as a viscous liquid.

EXAMPLE 11

LHT triol 240 (molecular weight 700) (2100 grams) 3 moles, triphenyl phosphite (310 grams) 1 mole and 5 grams of diphenyl phosphite (catalyst) were heated to 150° C. in vacuo. Phenol was stripped off. Nitrogen sparging was employed to remove the last traces of phenol. The distillate was 288 grams (slightly over 100% of theory) in 6 hours. The product was LHT 240 hexol phosphite and was filtered through Celite and recovered as a viscous light colored liquid.

EXAMPLE 12

LG 168 triol (molecular weight 1000) (300 grams) 3 moles, triphenyl phosphite 310 grams (1 mole) and 5 grams of diphenyl phosphite were heated in vacuo at 150° C. with nitrogen sparging. The phenol was removed in 6 hours by distillation. The yield of distillate was 290 grams (slightly in excess of theory). The LG 168 hexol phosphite was recovered as a viscous light colorless liquid after filtration through Celite.

EXAMPLE 13

Dipropylene glycol 268 grams (2.0 moles), diphenyl pentaerythritol diphosphite 380 grams (1.0 mole) and 3 grams of diphenyl phosphite (catalyst) were heated together at 140° C. in vacuo. After 3 hours a large quantity of low melting phenol was collected. This was returned to the reaction pot and the mixture fractionated through an 18 inch distillation column at 10 min. In this manner 175 grams of good phenol was collected. The mixture was then heated to 160° C. and purged with nitrogen to remove the balance of the phenol. There was recovered 28 grams more of distillate which was a mixture of phenol and dipropylene glycol. The pot residue was treated with Celite and filtered hot. The product obtained was polymeric bis dipropylene glycol pentaerythritol diphosphite (molecular weight about 1200–1500).

EXAMPLE 14

0.5 mole of 50% aqueous hydrogen peroxide were stirred into 0.5 mole of dipropylene glycol tetrol diphosphite. After reaction was complete the water was distilled off leaving a residue of dipropylene glycol tetrol diphosphate as a viscous liquid.

EXAMPLE 15

The procedure of Example 14 was repeated but the dipropylene glycol tetrol diphosphite was replaced by 0.5 mole of polypropylene glycol 2025 pentol triphosphite. The product recovered as a viscous liquid was polypropylene glycol 2025 pentol triphosphate.

EXAMPLE 16

The procedure of Example 14 was repeated replacing the dipropylene glycol tetrol diphosphite by 0.5 mole of LHT 240 hexol phosphite. There was recovered LHT 240 hexol phosphate as a viscous liquid.

EXAMPLE 17

The procedure of Example 14 was repeated replacing the dipropylene glycol tetrol diphosphite by 0.5 mole of LG–168 hexol phosphite. There was recovered LG–168 hexol phosphate as a viscous liquid.

EXAMPLE 18

To 0.5 mole of dipropylene glycol tetrol disphosphate there was added the stoichiometric amount of sulfur (16 parts or 0.5 mole). The mixture was heated to 110–130° C. until reaction was complete. The liquid product was dipropylene glycol tetrol dithiophosphate.

EXAMPLE 19

The procedure of Example 18 was repeated but the dipropylene glycol tetrol diphosphite was replaced by 0.5 mole of polypropylene glycol 2025 pentol triphosphite. The viscous liquid product was polypropylene glycol 2025 pentol trithiophosphate.

EXAMPLE 20

The procedure of Example 18 was repeated replacing the dipropylene glycol tetrol diphosphite by 0.5 mole of LHT 240 hexol phosphite. The viscous liquid product recovered was LHT 240 hexol thiophosphate.

EXAMPLE 21

The procedure of Example 18 was repeated replacing the dipropylene glycol tetrol diphosphite by 0.5 mole of LG–168 hexol phosphite. The viscous liquid product recovered was LG–168 hexol thiophosphate.

In the following Examples 22–28 a one shot foam was prepared by utilizing the following standard formulation:

| | |
|---|---|
| Water | 0.37 gram. |
| Dibutyl tin dilaurate | 0.07 gram. |
| Polydimethyl siloxane (50 centistokes grade) | 0.12 gram. |
| N-ethyl morpholine | 0.1 gram. |
| Polyol | As indicated. |

This mixture is designated in the following examples as formulation A.

Foams were made by adding formulation A to 5.2 grams of toluene diisocyanate (a mixture of 80% of the 2,4 isomer and 20% of the 2,6 isomer). The foams were then cured in a 110° C. oven for about 20 minutes.

In a comparison or control example there was employed 14 grams of LG–56 as the polyol. Utilizing a 10 inch cup the LG–56 foam rose 1.5 inches above the top of the cup.

EXAMPLE 22

The polyol used in formulation A was a mixture of 1 ml. (about 1 gram) of tris dipropylene glycol phosphite and 7 grams of LG–56. Upon addition of the 5.2 grams of toluene diisocyanate the cream time was 8 seconds and there was a fairly rapid rise. After 10 minutes of rise the foamed product was cured at 110° C. for 20 minutes. There was obtained a good foam with some closed cells. The foam rose 1.5 inches above the top of the cup and had a much lower density than the LG–56 foam.

When Example 22 was repeated the same results were obtained showing that the results were reproducible. The foam was semi-rigid in nature.

EXAMPLE 23

The polyol used in formulation A was a mixture 1 ml. (about 1 gram) of tris dipropylene glycol phosphite and 7 grams of polypropylene glycol 2025. After addition of the 5.2 grams of toluene diisocyanate the cream began in 8 seconds and there was a fairly rapid rise. There was a large volume 3 inches above the cup top. After curing at 110° C. for 20 minutes there was a nice foam which was somewhat harder than that in the LG–56 comparison example.

In Example 23 and the other foam examples silicone fluid 520 was equally effective when employed in place of the polydimethyl siloxane in the same amount.

EXAMPLE 24

The polyol used in formulation A was 3.1 ml. (about 3 grams) of tris polypropylene glycol 425 phosphite and 7 grams of polypropylene glycol 2025. After addition of the 5.2 grams of toluene diisocyanate the cream time was 10 seconds. There was a nice soft foam with some closed cells.

EXAMPLE 25

The polyol used in formulation A was 6.1 ml. (about 6 grams) of tris polypropylene glycol 425 phosphite and 7 grams of polypropylene glycol 2025. After addition of 5.2 grams of toluene diisocyanate there was obtained a very nice soft foam with a few closed cells and a nice density The formulation contained excess hydroxyl groups.

EXAMPLE 26

The polyol used in formulation A was 9 grams of tris polypropylene glycol 425 phosphite and 3 grams of polypropylene glycol 2025. The 5.2 grams of toluene diisocyanate was added and a very nice soft foam with some closed cells was produced.

EXAMPLE 27

Formulation A was used omitting the water and employing 6.05 grams of tris polypropylene glycol 425 phosphite. There was then added 5.2 ml. of toluene diisocyanate( about 5.2 grams) and the mixture allowed to react to form a prepolymer. There was then added 0.37 ml. of water and after a moderate cream time there was a nice rise to give a nice light foam. After curing at 110° C. for 20 minutes there was slight shrinkage. The product was semi-rigid with some closed cells.

EXAMPLE 28

Formulation A was used with a mixture of 1.50 ml. of tris dipropylene glycol phosphite (about 1.50 grams)

and 4.0 grams of polypropylene glycol 2025 as the polyol. Upon addition of 5.2 grams of toluene diisocyanate there was a moderate cream time and a fast rise to give a nice foam with closed cells. During cure the foam was hand crushed to break open the closed cells. The product was nice and had a very low density.

EXAMPLE 29

Example 28 was repeated but there was used only 4.9 grams of toluene diisocyante. There was not as much blow but a better foam with less closed cells was produced.

In preparing polyurethanes, e.g. polyurethane one shot foams, the following values are of interest.

| Compound | Molecular Wt. | OH Number | OH Equivalent In Grams [1] |
|---|---|---|---|
| tris dipropylene glycol phosphite | 430 | 392 | 1.99 |
| dipropylene glycl tetrol diphosphite | 728 | 309 | 2.52 |
| dipropylene glycol pentol triphosphite | 1,026 | 274 | 2.85 |
| tris polypropylene glycol 425 phosphite | 1,300 | 129 | 6.05 |
| polypropylene glycol 425 tetrol diphosphite | 2,187 | 102 | 7.7 |
| tris polypropylene glycol 1025 phosphite | 3,106 | 54 | 14.4 |
| tris polypropylene glycol 2025 phosphite | 6,106 | 27.5 | 28.2 |

[1] Equivalent to 14.4 grams of LG–56.

EXAMPLE 30

The polyol used in formulation A was tris dipropylene glycol phosphite in an amount of 1.99 grams. The water was omitted from formulation A. There was added 5.2 grams of toluene diisocyanate. After prepolymer formation was complete as indicated by a temperature rise to about 90° C. followed by allowing the product to cool to 30° C. (about 35 minutes were required) water was added with stirring. The product was a rigid foam.

EXAMPLE 31

The polyol used in formulation A was a mixture of 1.3 ml. (about 1.3 grams) of dipropylene glycol tetrol diphosphite and 7 grams of LG–56. Upon addition of 5.2 grams of toluene diisocyanate there was a rapid cream time and rise. A nice foam was produced having closed cells.

EXAMPLE 32

The polyol used in formulation A was a mixture of 1.4 ml. (about 1.4 grams) of dipropylene glycol pentol triphosphite and 7 grams ofg LG–56. Upon addition of 5.2 grams of toluene diisocyanate there was a rapid cream time and rise. The product had closed cells which were broken by hand crushing. After curing the product had nice tensile strength and hand properties.

EXAMPLE 33

The polyol used in formulation A was a mixture of 1.3 mol. of dipropylene glycol tetrol diphosphite and 7 grams of polypropylene glycol 2025. After adding 5.2 grams of toluene diisocyanate the foamed product had closed cells.

EXAMPLE 34

The polyol used in formulation A was 14.4 grams of tris polypropylene glycol 1025 phosphite. After adding 5.2 grams of toluene diisocyanate there was a nice cream and rise time. Some closed cells were noted. After curing in the oven at 110° C. for 20 minutes the foam had good tensile strength and tear strength a well as a nice feel.

EXAMPLE 35

The polyol used in formulation A was 28.2 grams of tris polypropylene glycol 2025 phosphite. After adding 5.2 grams of toluene diisocyanate there was a slow cream and rise time. No closed cells were noted. The cured product (110° C. for 20 minute) was an extremely nice foam and after standing for 12 days had a very high tensile strength.

EXAMPLE 36

The polyol used in formulation A was 4.9 grams of LHT 240 hexol phosphite (molecular weight 2100, OH number 160, OH equivalency 4.9 grams). After adding 5.2 grams of toluene diisocyanate there was a moderate foam rise which yielded a rigid foam. It was fairly strong after curing 1 hour at 120° C. The white product appeared to be a good foam with low density.

EXAMPLE 37

The polyol used in formulation A was a mixture of 2.5 grams of LHT 240 hexol phosphite and 7.2 grams of polypropylene glycol 2025. After adding 5.2 grams of toluene diisocyanate a foamed open cell product of the semi-rigid type was produced.

EXAMPLE 38

The procedure Example 37 was repeated but the polypropylene glycol 2025 was replaced by 7.2 grams of LG–56. A closed cell semi-rigid foam was produced.

The following examples are drawn to non-foamed polyurethanes.

EXAMPLE 39

Forty-three grams (0.1 mole) of tris dipropylene glycol phosphite, 28.7 grams (0.165 mole) of toluene diisocyanate (80/20 2,4/2,6 isomer ratio) were heated together at 90° C. for 1 hour and dissolved in 100 ml. of dimethyl formamide and portions of the product were painted on (a) a glass Petri dish, (b) a steel plate and (c) a piece of wood. The samples were placed in an oven at 120° C. for 1 hour to remove the solvent and then air cured for 4 hours. In all cases a hard clear tough resin coating was obtained. The coating did not burn and acted as a fire retardant. The polyurethane was useful therefore as a non-burning paint.

EXAMPLE 40

Forty-two ml. of octane solvent were heated to 70° C. and then 10.0 ml. of bis polypropylene glycol 425-pentaerythritol diphosphite (molecular weight 1200–1500) added. The mixture was heated to boiling and a little water present azeotroped out. Then 1.74 ml. of toluene diisocyanate (80% 2,4; 20% 2,6) was added and the mixture refluxed for 2 hours. Next 0.65 ml. of water was added and the mixture refluxed an additional 30 minutes. This precipitated a mass of polymer granules. The mixture was cooled to 50° C. and the product filtered off and air dried in an oven at 50° C. The product was ground in a mortar with a pestle to give a rubbery substance. This was placed in a Carver press at 15,000 p.s.i. to give a hard rubber light block. It appeared to be a good elastomer. The color was a translucent white.

The product was suitable to mold cups and could also be employed to spin threads.

EXAMPLE 41

2.5 moles of LHT triol 240, 1 mole of triphenyl phosphite and 5 grams of diphenyl phosphite were heated to 150° C. in vacuo. Phenol was stripped off until about 3 moles of phenol were removed. The residue was LHT 240 nonoldiphosphite.

EXAMPLE 42

3.5 moles of LHT triol 240, 1.5 moles of triphenyl phosphite and 5 grams of diphenyl phosphite were heated to 150° C. in vacuo. Phenol was stripped off until about 4.5 moles of phenol were removed. The residue was LHT 240 dodeca-ol triphosphite.

EXAMPLE 43

3 moles of sorbitol-propylene oxide adduct having a molecular weight of 1000, 1 mole of triphenyl phosphite and 5 grams of diphenyl phosphite were heated to 150° C. in vacuo. 3 moles of phenol were stripped off. The product obtained was tris-(sorbitol-propylene oxide adduct) phosphite. The product had 15 free hydroxyl groups in the molecule.

EXAMPLE 44

3 moles of pentaerythritol-propylene oxide adduct having a molecular weight of 1000, 1 mole of triphenyl phosphite and 5 grams of diphenyl phosphite were heated to 150° C. in vacuo. 3 moles of phenol were stripped off. The product was tris (pentaerythritol-propylene oxide adduct) phosphite. The product had 9 free hydroxyl groups in the molecule. In place of the adduct having a molecular weight of 1000 there can be used in this example the pentaerythritol-propylene oxide adducts having molecular weights of 750 or 2000 for reaction with the triphenyl phosphite.

The disphosphites and triphosphites of sorbitol-propylene oxide adducts and pentaerythritol-propylene oxide adducts can also be made be replacing the LHT triol 240 in Examples 41 and 42 by an equal molar amount of the sorbitol-propylene oxide adduct having a molecular weight of 1000 or the pentaerythritol-propylene oxide adduct having a molecular weight of 1000.

The products of Examples 41–44 are useful in making polyurethane foams in the manner previously indicated. Thus there can be used an amount of any of the phosphites in Examples 41–44 equivalent of 14.4 grams of LG-56 in formulation A and a rigid foam can be prepared by addition of 5.2 grams of toluene diisocyanate. Such foams are useful for flame resistant insulation, etc.

What is claimed is:
1.

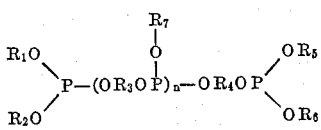

wherein $R_1$, $R_2$, $R_5$, $R_6$, and $R_7$ are the residue of polypropylene glycol from which one of the hydroxyl groups has been removed, $R_3$ and $R_4$ are selected from the group consisting of the residues of polyethylene glycol and polypropylene glycol from which the two hydroxyl groups have been removed and $n$ is selected from the group consisting of zero and an integer.

2. A compound according to claim 1 wherein the majority of the hydroxyl groupings present in $R_1$, $R_2$, $R_5$, $R_6$, and $R_7$ are secondary hydroxyl groups.

3. A compound according to claim 2 wherein $R_3$ and $R_4$ are the residues of polypropylene glycol.

4. A compound according to claim 1 wherein $R_3$ and $R_4$ are the residues of polypropylene glycol.

5. A compound according to claim 1 wherein $n$ is zero and $R_4$ is a polypropylene glycol residue.

6. A compound according to claim 1 wherein the average value of $n$ is between 1 and 7 and $R_3$ and $R_4$ are residues of a polypropylene glycol residue.

7. A compound according to claim 1 wherein $R_3$ and $R_4$ are the residues of polypropylene glycol and the majority of the hydroxyl groupings present in $R_1$, $R_2$, $R_5$, $R_6$, and $R_7$ are secondary hydroxyl groups.

8. A compound according to claim 7 wherein $R_1$, $R_2$, $R_3$, $R_4$, $R_5$, $R_6$, and $R_7$ are the residues of dipropylene glycol.

9. A compound according to claim 7 wherein $R_1$, $R_2$, $R_3$, $R_4$, $R_5$, $R_6$, and $R_7$ are the residues of polypropylene glycols having an average molecular weight between 400 and 2500.

10. A compound according to claim 1 wherein $R_1$, $R_2$, $R_3$, $R_4$, $R_5$, $R_6$, and $R_7$ are the residues of tripropylene glycol.

11. A process of preparing a compound having the formula

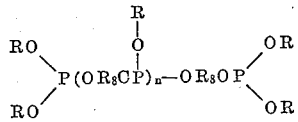

wherein all of the R's are the residue of dipropylene glycol from which one of the hydroxyl groups has been removed and both $R_8$'s are the residue of dipropylene glycol from which the two hydroxyl groups have been removed and $n$ is selected from the group consisting of zero and an integer comprising heating tris dipropylene glycol phosphite and removing the dipropylene glycol formed.

12. A process of preparing a compound having the formula

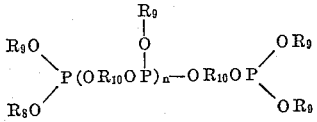

wherein all of the $R_9$'s are the residue of tripropylene glycol from which one of the hydroxyl groups has been removed and both $R_{10}$'s are the residue of tripropylene glycol from which the two hydroxyl groups have been removed and $n$ is selected from the group consisting of zero and an integer comprising heating tris tripropylene glycol phosphite and removing the tripropylene glycol formed.

13.

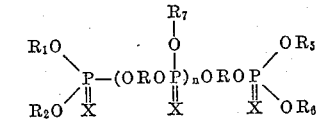

wherein $R_1$, $R_2$, $R_5$, $R_6$, $R_7$ are the residue of polypropylene glycol from which one of the hydroxyl groups has been removed, $R_3$ and $R_4$ are selected from the group consisting of the residues of polyethylene glycol and polypropylene glycol from which the two hydroxyl groups have been removed, $n$ is selected from the group consisting of zero and an integer, and $x$ is selected from the group consisting of nothing, oxygen and sulfur.

14. A compound according to claim 13 wherein $R_3$ and $R_4$ are the residue of polypropylene glycol.

15. A compound according to claim 14 wherein $n$ is zero.

16. A compound according to claim 13 wherein $n$ is 1.

References Cited in the file of this patent
UNITED STATES PATENTS

| | | |
|---|---|---|
| 2,372,244 | Adams et al. | Mar. 27, 1945 |
| 2,622,071 | Harrison | Dec. 16, 1952 |
| 2,728,790 | Sroog | Dec. 27, 1955 |
| 2,755,296 | Kirkpatrick | July 17, 1956 |
| 2,841,608 | Hechenbleikner et al. | July 1, 1958 |
| 2,961,454 | Gould et al. | Nov. 22, 1960 |
| 3,009,939 | Freidman | Nov. 21, 1961 |